United States Patent [19]

Falk et al.

[11] Patent Number: 4,659,766

[45] Date of Patent: Apr. 21, 1987

[54] GRAFT COPOLYMER - PLASTICIZED PVC BLENDS AS THERMOPLASTIC ELASTOMERS

[75] Inventors: John C. Falk, Northbrook; Leland B. Kliever, Naperville, both of Ill.

[73] Assignee: Borg-Warner Chemicals, Inc., Parkersburg, W. Va.

[21] Appl. No.: 562,890

[22] Filed: Dec. 19, 1983

[51] Int. Cl.⁴ ............................................. C08L 51/00
[52] U.S. Cl. .................................................. 524/504
[58] Field of Search ........................................ 524/504

[56] References Cited

U.S. PATENT DOCUMENTS

| | | |
|---|---|---|
| 3,251,904 | 5/1966 | Souder et al. |
| 3,657,390 | 4/1972 | Tanaka et al. |
| 3,657,391 | 4/1972 | Curfman |
| 3,671,610 | 6/1972 | Amagi et al. |
| 3,813,278 | 5/1974 | Katagiri et al. .................... 524/504 |
| 4,259,460 | 3/1981 | Schwarz |
| 4,350,795 | 9/1982 | Bohm et al. |

FOREIGN PATENT DOCUMENTS

| | | | |
|---|---|---|---|
| 769113 | 10/1967 | Canada ................................. | 524/504 |
| 0058331 | 8/1982 | European Pat. Off. ............ | 524/504 |
| 50-94065 | 7/1975 | Japan ................................... | 524/504 |
| 51-12854 | 1/1976 | Japan ................................... | 524/504 |
| 51-166336 | 6/1976 | Japan ................................... | 524/504 |
| 53-45351 | 4/1978 | Japan ................................... | 524/504 |
| 841889 | 7/1960 | United Kingdom . | |
| 2061975 | 5/1981 | United Kingdom ................ | 524/504 |

*Primary Examiner*—Joseph L. Shoter
*Assistant Examiner*—N. Sarofim
*Attorney, Agent, or Firm*—Richard J. Schlott; Emily A. Richeson

[57] ABSTRACT

Compositions comprising high rubber ABS graft copolymers, PVC and plasticizers for PVC are useful as thermoplastic elastomers. Formulations exhibiting good solvent resistance, abrasion and compression set characteristics may be used in shoe soling, wire and cable covering, hose and tubing and automotive applications.

4 Claims, No Drawings

GRAFT COPOLYMER - PLASTICIZED PVC BLENDS AS THERMOPLASTIC ELASTOMERS

BACKGROUND OF THE INVENTION

This invention relates to thermoplastic elastomer compositions comprising blends of graft copolymers, polyvinyl chloride (PVC) and plasticizers. The compositions require no curing or vulcanization to develop elastomeric properties. The compositions thus remain thermoplastic and can be repeatedly remolded or extruded.

The term "thermoplastic elastomer" has generally been applied to elastomers that can be readily processed and reprocessed by conventional belt processing equipment by virtue of the fact that such elastomers are not cured or vulcanized. The reprocessability of these elastomers compared with conventional cured or thermoset rubbers results in a great reduction in loss due to scrap, with consequent economic benefits for the processor. A variety of such materials have been introduced in recent years such as thermoplastic polyesters, styrene block copolymers, and thermoplastic olefin-rubber blends. Typical of such materials are the styrene-butadiene-styrene block copolymers sold as Kraton brand elastomers by the Shell Chemical Co. and the Hytrel brand polyester elastomers sold by DuPont. Many of these elastomers have found wide application in consumer goods such as in shoe soling formulations and the like, as well as in such industrial applications as wire coating, hose and tubing, electrical connectors and automotive parts.

Currently available thermoplastic elastomers suffer some disadvantages in use. In particular, formulations based on olefinic resins including SBS block copolymers exhibit poor resistance to hydrocarbon solvents and low abrasion resistance which may limit their use in particular environments. Additionally, adhesion to dissimilar materials is poor, and a surface chlorination or other primer treatment is often needed to increase adhesive bonding between, for example, a molded shoe sole formed of such materials and a synthetic shoe upper. Primer treatment of the surfaces of molded goods is also needed where the part is to be painted, which further increases the production cost of such goods.

High rubber content graft copolymers, by which is meant graft polymers prepared by graft-polymerizing rigid monomers in the presence of rubbery polymeric substrates and comprising greater than 50 wt% rubbery substrate polymer, are widely used as impact modifiers for thermoplastics such as styrene resins, styrene-acrylonitrile (SAN) resins, PVC resins and the like. Typical of such materials are graft copolymers of styrene and acrylonitrile and optionally methylmethacrylate on diene rubber substrates such as the Blendex brand modifiers sold by Borg-Warner Chemicals, Inc. and graft copolymers of methacrylates on acrylic rubber substrates and of methacrylates on diene rubber substrates sold as modifier resins by Rohm and Haas. A wide variety of such graft copolymers is readily available commercially. In general, rubbery graft copolymer impact modifiers are employed at levels of less than 30 wt% and often at less than 10 wt% in blends with rigid resins to provide high impact thermoplastics. Although often referred to as rubbery modifiers, these copolymers for the most part are not truly elastomeric and do not exhibit useful elastomeric properties without further modification and vulcanization. These materials therefore are not considered to be thermoplastic elastomers.

The modification of nitrile rubbery stocks by adding PVC together with a conventional PVC plasticizer has long been practiced in the rubber compounding art. A minor proportion of PVC, usually less than 33 wt%, is used to impart increased sunlight and ozone resistance to nitrile rubber, together with improved abrasion and tear properties. Such formulations find use in wire and cable coverings and in the production of hose and tubing, as well as in shoe sole formulations. These blends are, for most applications, normally vulcanized to provide elastomeric character and therefore are not considered to be thermoplastic elastomers.

Thermoplastic elastomer formulations based on high rubber graft copolymers would be a useful advance in the art. The graft copolymers are widely available and readily produced by a variety of well known and economical processes. As is well known, graft copolymers may be readily modified by varying the type and proportion of monomers used in their preparation to selectively improve such characteristics as abrasion and solvent resistance, adhesion, weatherability and the like. Elastomers based on graft copolymers could thus find application in the production of molded and extruded goods to meet a wide variety of environmental requirements including shoe soling, extruded hose and tubing, wire and cable insulations, the production of flexible cord, automotive parts and the like.

SUMMARY OF THE INVENTION

Compositions comprising blends of high rubber graft copolymers, PVC and plasticizer are useful as thermoplastic elastomers. The compositions do not require vulcanization, exhibit a rubbery feel and appearance, have good resistance to compression set and may be melt-processed in conventional molding and extrusion equipment.

DETAILED DESCRIPTION OF THE PREFERRED EMBODIMENTS

The high rubber graft copolymers useful in the practice of this invention are conventional graft copolymers prepared by graft-polymerizing less than about 50 wt% of at least one rigid monomer such as a vinyl aromatic monomer, an acrylic monomer, a vinyl nitrile monomer or a mixture thereof in the presence of more than about 50 wt% of a pre-formed rubbery substrate such as a 1,3-diene polymer or a rubbery copolymer thereof. More particularly, the graft copolymers comprise from 50 to 90 wt% of a rubbery substrate 1,3-diene polymer such as for example polybutadiene or polyisoprene, or a copolymer of a 1,3-diene with less than about 50 wt% of a rigid copolymerizable vinyl or vinylidene monomer such as for example a styrene monomer, an acrylate ester monomer, or a vinyl nitrile monomer, and from 10 to 50 wt% rigid graft phase formed from at least one rigid vinylidene or vinyl monomer selected from the group consisting of vinyl aromatic monomers, acrylic monomers, vinyl nitrile monomers and mixtures thereof. The use of the term rigid is somewhat inappropriate when applied to a monomer or monomer mixture. The term rigid monomer for the purposes of this invention means a polymerizable vinyl or vinylidene monomer which when homopolymerized provides a homopolymer having rigid, plastic or non-rubbery character including a glass transition temperature (Tg) greater than about 20° C. The term rubbery substrate or rubbery copolymer means, as is conventionally recognized, a polymer having a rubbery or elastomeric character including a glass transition temperature below about 20° C., and preferably below about 0° C. As is conventional in the preparation of high rubber graft copolymers, either or both the rubbery substrate and the graft phase may further include minor amounts, usually less than about 10 wt%, of a copolymerizable di- or trifunctional monomer to cross-link either or both polymeric components. The high rubber graft copolymers may be prepared by any of the variety of conventional graft polymerization processes including emulsion, suspension, sequential, bulk and solution polymerization processes. These methods are well-known in the polymerization art and are widely practiced commercially to produce a high rubber graft copolymers as impact modifiers for thermoplastic resins.

Typical of the high rubber graft copolymers useful in the practice of this invention are those generally referred to as high rubber ABS resins, which may generally be described as graft copolymers of styrene and acrylonitrile on polybutadiene or styrene-butadiene rubbers containing greater than 50 wt% of rubbery substrate, which includes the art-related high rubber graft copolymers such as methylmethacrylate-styrene-acrylonitrile grafts on polybutadiene or styrene-butadiene rubbers (MABS resins), graft copolymers of methylmethacrylate and, optionally, styrene or polybutadiene or styrene-butadiene rubbers (MBS resins) and the like. These resins are widely known and commercially available in the art.

PVC resins useful in the practice of this invention include homopolymers of vinyl chloride and copolymers of vinyl chloride containing up to 20 wt% of copolymerizable monomers such as vinylidene chloride and the like. Methods for preparing the PVC polymers are also well known and such resins are widely available commercially in a variety of molding and extrusion grades.

The plasticizers useful in the practice of this invention include any of the plasticizers commonly used in the art with vinyl chloride resins. Typical plasticizers include ester plasticizers such as dialkyl phthalates and the like and the phosphate plasticizers such as tri(alkylphenyl)-phosphates and the like, as well as a wide variety of plasticizers based on vegetable oils such as expoxidized soyabean oil and the like.

The compositions of this invention comprise from 70 to 30 parts by weight of high rubber graft copolymer, from 30 to 70 parts by weight of PVC resin and from 45 to 65 parts by weight of a PVC plasticizer. The compositions may be prepared by any of the conventional rubber compounding techniques including dry blending the components then melt processing in a compounding extruder or on a two-roll mill. Alternatively the components may be mixed in batch melt mixing equipment such as a Banbury mixer or the like. The compositions may then be further extruded or injection molded in conventional ram- or screw-injection molding machines to form extruded or molded goods.

The compositions of this invention may further include antioxidants, stabilizers, fillers, pigments, extenders, secondary plasticizers, flame retardants, dyes and the like as is commonly practiced in the rubber compounding art.

The practice of this invention may be better understood through consideration of the following examples, which are provided by way of illustration of the invention and not in limitation thereof.

In the Examples, the following terms are employed:
Tensile Str=tensile strength at room temperature, ASTM D638
E=elongation at break, ASTM D638
Hardness=shore hardness, ASTM D2240, A range
Tabor Abr=Tabor abrasion, loss in grams/1000 cycles
Vol Swell=volume swell on exposure to indicated solvents are room temperature for 24 hrs
Comp Set=compression set at indicated temperature, 22 hrs, ASTM D395
Elast Rec=Elastic Recovery, determined by extension at 100% for 1 min, releasing and measuring after 60 sec

EXAMPLES 1–4

In the following Examples 1–4, compositions were prepared by compounding the formulations on a two-roll mill at 350° F., sheeting out the compositions and cooling to room temperature. The compositions were then cut into strips and injection molded on 1.0 oz Battenfeld reciprocating screw machine, using barrel temperatures in the range 280°–300° F. and a mold temperature of 100° F. to form test specimens. The formulations and the physical properties are summarized in Table I.

TABLE I

| Example No: | 1 | 2 | 3 | 4 |
|---|---|---|---|---|
| Composition: | | | | |
| Rubber pbw | 0 | 33 | 67 | 100 |
| PVC pbw | 100 | 67 | 33 | 0 |
| Plasticizer pbw | 62.5 | 62.5 | 47.5 | 43.7 |
| Stabilizer pbw | 2.5 | 2.5 | 2.5 | 2.5 |
| ODPP pbw | 2.5 | 2.5 | 2.5 | 2.5 |
| Properties: | | | | |
| Tensile Str, psi | 1800 | 1050 | 530 | 230 |
| E % | 230 | 160 | 120 | 75 |
| Hardness, Shore A | 75 | 69 | 71 | 66 |
| Elast Rec, % | 85 | 90 | 90 | — |
| Tabor Abr, g/Kc | 0.16 | 0.24 | 0.49 | 1.7 |
| Vol Swell, 24 hr, RT | | | | |
| ASTM #3 | 1.3 | 1.0 | 3.1 | 8.9 |
| Fuel A | 1.7 | 3.9 | 15 | 21 |
| Fuel B | 31 | 27 | 38 | 89 |
| Comp Set, %/22 hr | | | | |
| RT | 24 | 23 | 24 | 42 |
| 100° F. | 54 | 46 | 47 | 73 |
| 158° F. | 74 | 63 | 46 | 89 |

Notes: Rubber = Blendex 336 ABS with 65% rubbery (SBR) substrate from Borg-Warner Chemicals, Inc.
PVC = Polyvinylchloride, obtained as Geon 103 EP F76 from B. F. Goodrich Co.
Plasticizer = Dioctylphthalate
Stabilizer = Mark 550 barium-lead soap from Argus Chemical Co.
ODPP = diphenylisoctylphosphite from Borg-Warner Chemicals, Inc.
For testing definitions, see text.

It will be apparent that the compositions of this invention, Examples 2 and 3, exhibit good tensile strength and elastic recovery, as well as useful solvent resistance. Surprisingly, the compression set characteristics of these compositions, particularly at elevated temperatures, is considerably better than either of the control blends, Examples 1 and 4. The compositions of this invention are thus tough, durable thermoplastic elastomers.

It will be recognized by those skilled in the art that further modifications may be made in the graft copolymer component and in the base formulation to emphasize and enhance particular physical properties such as solvent resistance, hardness and abrasion resistance through use of grafting monomers other than styrene and acrylonitrile, other rubbery substrates, different proportions of PVC and plasticizer, and selection of plasticizers as may be needed for a particular end-use. The compositions of this invention thus provide the compounder with a great degree of flexibility in meeting the requirements for use in a variety of widely differing applications.

EXAMPLE 5

A shoe soling composition was prepared by dry-blending the ingredients summarized in Table II in a Henschel mixer, then compounding the mixture into pellets on a Werner-Pfleiderer ZSK-28 twin screw extruder, using barrel temperatures of from 298° F. (zone 1) to 357° F. (zone 3), at screw speed of 175 RPM. Specimens, molded as before, were tested to provide physical property data summarized in Table II.

TABLE II

|  | Ex. 5 |
| --- | --- |
| Composition: | |
| Rubber pbw | 40 |
| PVC pbw | 60 |
| Plasticizer pbw | 55 |
| S.F. BW40 pbw | 10 |
| Epoxy Soy Oil pbw | 5 |
| Stabilizer pbw | 1.25 |
| DHOP pbw | 2.5 |
| Properties: | |
| Tensile Str, psi | 680 |
| E, % | 150 |
| Hardness, Shore A | 70 |
| Tabor Abr, g/Kc | 0.56 |
| Vol Swell, 24 hr, RT | |
| ASTM #3 | −0.6 |
| Fuel A | 9.0 |
| Fuel B | 25 |

Notes: See notes to Table I.
S.F. BW40 = purified cellulose from Brown Co.
Epoxy Soy Oil = epoxidized soyabean oil from C. P. Hall.
DHOP = phosphite stabilizer from Borg-Warner Chemicals, Inc.

It will be seen that the composition of Example 5 provides enhanced solvent resistance compared with the compositions of Examples 2 and 3, demonstrating the wide variability in properties that can be achieved with the compositions of this invention through compounding modifications.

It will be seen that this invention is a composition comprising from 70 to 30 parts by weight of a high rubber graft copolymer having greater than 50 wt% rubber substrate from 30 to 70 parts by eight of a polyvinyl chloride resin and from 45 to 65 parts by weight PVC plasticizer. The preferred high rubber graft copolymers are ABS and MABS resins, which may further be described as comprising less than 50 wt% of a graft phase formed of at least one monomer selected from the group consisting of vinyl aromatic monomers such as styrene and alpha methylstyrene, acrylic monomers such as methylmethacrylate, vinyl cyanide monomers such as acrylonitrile, and correspondingly greater than 50 wt% of a substrate selected from the group consisting of 1,3-diene polymers and copolymers thereof with less than 50 wt% of a copolymerizable vinyl or vinylidene monomer.

The compositions are useful as thermoplastic elastomers in formulating molded and extruded consumer goods such as in shoe soling compositions, adhesives, hose and tubing and the like. As will be recognized by those familiar with the rubber compounding art, these compositions may further comprise additional thermoplastic resins, as well as antioxidants, stabilizers, dyes, pigments, flame retardants, fillers, processing aids, extenders, secondary plasticizers and the like as needed for particular uses, and such further additions and modifications are thus contemplated as within the scope of the invention.

We claim:

1. A thermoplastic elastomer composition comprising:
   (a) from 70 to 30 parts by weight of a high rubber graft copolymer;
   (b) from 30 to 70 parts by weight of a PVC resin; and
   (c) from 45 to 65 parts by weight of a plasticizer for PVC resins.

2. The composition of claim 1 wherein the high rubber graft copolymer is a graft copolymer comprising less than 50 wt% of a rigid graft phase formed of at least one monomer selected from the group consisting of vinyl monomers, vinylidene monomers and mixtures thereof, and correspondingly greater than 50 wt% of a rubbery substrate selected from the group consisting of 1,3-diene polymers and copolymers thereof.

3. The composition of claim 1 wherein the high rubber graft copolymer is an ABS graft copolymer consisting of greater than 50 wt% of a rubbery substrate copolymer and, correspondingly, less than 50 wt% of rigid graft phase.

4. A thermoplastic elastomer composition comprising:
   (a) from 70 to 30 parts by weight of an ABS graft copolymer consisting of greater than 50 wt% of a rubbery substrate and, correspondingly, less than 50 wt% of a rigid graft phase;
   (b) from 30 to 70 parts by weight of a PVC resin; and
   (c) from 45 to 65 parts by weight of a plasticizer for PVC resins.

* * * * *